United States Patent [19]
Högner et al.

[11] Patent Number: 5,413,621
[45] Date of Patent: May 9, 1995

[54] PROCESS FOR COOLING AND PURIFYING HOT, DUST-LADEN FLUE GASES CONTAINING DIOXINS AND OTHER TOXIC SUBSTANCES

[75] Inventors: Winfried Högner, Oberhausen; Hans Piechura, Bochum, both of Germany

[73] Assignee: Man Gutehoffnungshutte Aktiengesellschaft, Oberhausen, Germany

[21] Appl. No.: 82,591

[22] Filed: Jun. 25, 1993

[30] Foreign Application Priority Data

Jun. 27, 1992 [DE] Germany ............... 42 21 239.1

[51] Int. Cl.$^6$ ............................... C22B 9/20
[52] U.S. Cl. ............................... 75/376; 75/414; 75/581; 75/584; 75/961; 75/10.36
[58] Field of Search ............ 75/414, 376, 10.36, 75/581, 584, 961

[56] References Cited
U.S. PATENT DOCUMENTS
5,167,699 12/1992 Pirklbauer et al. ............ 75/10.53

FOREIGN PATENT DOCUMENTS
3827086A1 2/1990 Germany .
4034417A1 4/1992 Germany .

OTHER PUBLICATIONS
G. Bröker VDI-Berichte, Nos. 634 1987, pp. 515-539.

Primary Examiner—Melvyn J. Andrews
Attorney, Agent, or Firm—McGlew and Tuttle

[57] ABSTRACT

The present invention pertains to a process for cooling and purifying hot, dust-laden flue gases enriched with dioxins and other toxic components from a melting vessel, e.g., an arc furnace.

Both the flue gases A, B generated during charging and those generated during the melting operation are collected, and the toxic components are removed in two ways.

The flue gases A collected in the exhaust hoods 2 are fed into the filter 6, while previously blowing an additive 12, on which the toxic components settle before reaching the filter bags, into the flue gas stream A.

The hot flue gases B drawn off directly from the arc furnace 1 are introduced into a combustion chamber 3 after passing through a water-cooled section 4, and are subjected to afterburning in the combustion chamber 3 to remove the toxic pollutants. These gases are then intermediately cooled in a second, water-cooled section 5, further cooled by adding more additional cold air A, and fed into the filter 7.

The contaminated dust E is charged again into the arc furnace 1.

20 Claims, 1 Drawing Sheet

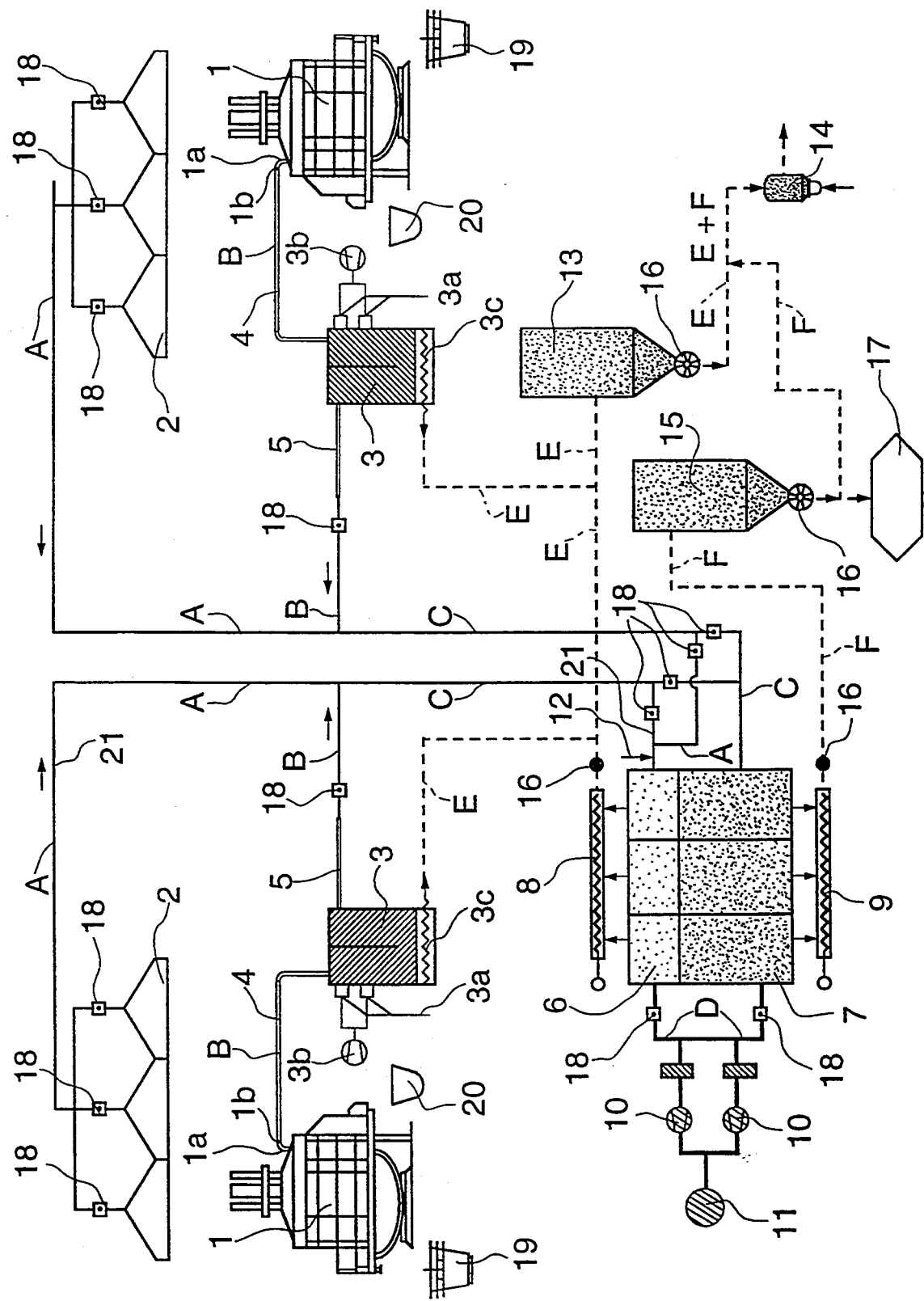

PROCESS FOR COOLING AND PURIFYING HOT, DUST-LADEN FLUE GASES CONTAINING DIOXINS AND OTHER TOXIC SUBSTANCES

FIELD OF THE INVENTION

The present invention pertains to a process for cooling and purifying hot, dust-laden flue gases, and in particular to a process for flue gas containing dioxins and other toxic substances from a melting vessel, e.g., an arc furnace, induction furnace, converter, and the like, wherein the gas is drawn off, cooled, and purified according to a dry or wet method, and wherein the dust or sludge discharged from the waste gas purification plant is recharged into the melting vessel or used in another way.

BACKGROUND OF THE INVENTION

The flue gases discharged from the melting vessel must be cooled and purified before being discharged into the atmosphere according to the specifications of TLA-Luft (Technical Instructions for Clean Air Maintenance) or other national regulations for clean air maintenance in, e.g., steel-making, especially electric steel production in arc furnaces or induction furnaces. Usually a one-step dry purification is carried out, e.g., in a cloth filter plant preceded by a water-cooled gas cooling section, in order to reduce the dust content in the purified waste gas to, e.g., 10 mg/Nm$^3$.

Flue gases containing dioxins and other toxic substances are inevitably released when scrap metal is charged into the melting vessel.

Various comparative studies and measures for reducing the dioxin emissions from waste incinerator plants, especially those used for domestic waste, are described in the VDI-Berichte Nos. 634, 1987, pp. 515–539.

According to these investigations, dioxins (PCDDs) and furans (PCDFs) are formed due to the incineration of PCVs as well as PCBs, chlorophenols and chlorobenzenes, which are present in small amounts in waste, e.g., as dielectrics, wood preservatives, disinfectants, preservatives, etc., and are again found on the dusts present in the flue gases and consequently in the filter dust after cooling.

Investigations on flue gas purification plants of waste incinerator plants, which operated according to the so-called dry process or the quasi-dry process, have demonstrated filtration efficiencies exceeding 99.0% for PCDDs and PCDFs.

In the dry process, flue gases with a temperature of 255°–270° C. are quenched to 110°–140° C. with water, and mixed with dry Ca(OH)$_2$ in a separate reactor.

In the quasi-dry process, the flue gas is quenched with milk of lime. The metering of milk of lime is regulated as a function of the flue gas conditions such that the liquid will completely evaporate, and the suspended calcium hydroxide will be present in the flue gas in the particulate form. The solids are then separated by cloth filters in both processes.

DE 40 34 417 A1 describes the preparation and the use of highly reactive dry reagents for waste gas and waste water purification which contain, e.g., mixtures of hydrated lime or calcium hydroxide with additives that are characterized by high purification performance and the possibility of safe disposal of the reaction products on landfills.

These reagents generally have high porosity and a correspondingly large specific surface. The reagents are used for purifying waste gases and flue gases predominantly in a wet, quasi-dry, or dry process, as well as directly in the waste gas flow in front of an electrostatic precipitator of a flue gas purification plant.

DE 38 27 086 A1 discloses a process and a device for the thermal decontamination of dioxin- and furan-containing filter dusts, which also contain heavy metal compounds at the same time.

The material to be decontaminated is melted down at a temperature between 1,400° C. and 1,600° C. and for a predetermined corresponding hold time in an inductively heated crucible furnace, and is then brought to the liquid state of aggregation, while the dioxins and furans are destroyed and heavy metals are bound in the melt. The flue gas generated in the crucible furnace is passed through a high-temperature section, in which complete inertization or decontamination of the flue gas takes place at high temperatures (at least 1,200° C.) and hold times exceeding 2 sec.

SUMMARY AND OBJECTS OF THE INVENTION

The object of the present invention is to develop a process for cooling and purifying hot, dust-laden flue gases containing dioxins and other toxic substances from a melting vessel, and to ensure that dioxins and other toxic gases are not re-formed during the cooling of the flue gas. It is also an object that the dioxins and toxic components bound to the dust particles will be definitively destroyed.

The treatment of the flue gases discharged from the melting vessel, e.g., an arc furnace, is divided depending on how the flue gas was generated. Flue gases generated during the charging of metallic charge materials into the hot arc furnace are collected via exhaust hoods above the arc furnace, and flue gases generated during the melting down of metallic charge materials in the arc furnace are drawn off via a so-called fourth cover hole. Depending on the needs of the operation, individual suction points can be connected to or disconnected from the filter (bag filter) by means of reducing dampers or valves.

All of the gas drawn off from the arc furnace is switched to, or taken from, the exhaust hoods during charging and tapping of the arc furnace. The flue gases generated during these processes are thus collected by the cover hoods and fed into the bag filter.

Dioxins and other toxic gases have already formed in the flue gas due to the combustion of organic components during the charging of the charge material into the hot arc furnace. A prior-art additive consisting of carbon (activated carbon or open-hearth furnace coke) and calcium hydroxide is therefore blown into the gas flow in front of the filter, as a result of which dioxin and other toxic gases are adsorbed.

The additive settles on the filter bags and adsorbs the dioxins and other toxic substances contained in the waste gas.

After dedusting the filter bags, the dust is contaminated with dioxins and other toxic materials from the toxic gases. A defined number of filter chambers or a separate filter are provided, into which only the contaminated dust generated during charging can enter via a switchover station. this is done in order to prevent the above-mentioned contaminated dust from being mixed with non-contaminated dust from a separate stage of the process of the present invention. The switchover station is operated automatically as a function of the position of the furnace cover.

The hot flue gases being discharged from the arc furnace during the melting operation are subjected to afterburning at a gap between the furnace cover elbow 5 and a water-cooled suction line by mixing in ambient air.

Under the top platform, the flue gas enters an externally heated combustion chamber. The combustion chamber is designed with steel plate construction having a refractory lining and accommodates a dust discharge means on the underside. The combustion chamber is equipped with burners, which are regulated such that the waste gas temperature is always constant. To burn the dioxins and other toxic gases, the discharge temperature of the combustion chamber is adjusted, e.g., to a permanent temperature of ca. 1,200 C. Furthermore, the combustion chamber is dimensioned such that the hold time of the waste gases in the combustion chamber is longer than the reaction time required for the combustion of the toxic pollutants.

The hold time of the waste gases in the combustion chamber ensures that the dioxins and other toxic gases generated at the beginning of the melting process due to the combustion of organic components of the charge material will be afterburned and destroyed as a result.

The stepwise cooling of the flue gases from ca. 1,200° C. to a temperature of about 600° C. initially takes place in the downstream water-cooled waste gas line.

To prevent dioxins and other toxic gases from reforming with certainty, it is necessary to abruptly cool the flue gas, which has a temperature of ca. 600° C., in a subsequent step. To do so, an amount of additional cold air, which is drawn in from the furnace house, is added to the hot flue gas from the exhaust hoods. This amount of additional air is selected to be such that the maximum allowable filter inlet temperature of ca. 130° C. will not be exceeded at the same time.

The bag filter operates under vacuum. It is divided into individual chambers, which can be disconnected from the gas flow during operation for maintenance and repair purposes. Moreover, certain chambers are always provided for purifying the waste gases that are generated during the charging of the arc furnace, so that mixing of the flue gases drawn off from the hoods or from the melting vessel is ruled out. The filter bags are dedusted with compressed air.

As was mentioned, dioxin-containing flue gases are also generated during the charging of the metallic charge materials into the arc furnace, and these flue gases are drawn off via the exhaust hoods. It is possible, in principle, to install a combustion chamber behind or downstream of the exhaust hoods here, but it is not economical because the volumes drawn off are too large for thermal aftertreatment. Therefore applicant prefers the above-described procedure.

The dust loaded with dioxins and other toxic substances from the filter chambers of the bag filter is charged into a separate dust silo and is fed onto a pushing vibrator for transportation from the dust silo. This dust is mixed in the pushing vibrator or in the metering vessel with the non-contaminated dust from the other silo, which may be enriched with zinc and lead because of the poor quality of the scrap metal, and is blown into the bath of the arc furnace. The residual dioxins and toxic components are incinerated in the combustion chamber located downstream of the arc furnace, so that the dust can subsequently enter the filter chambers that are intended for the non-contaminated dust. The dust, which continues to be enriched with lead and zinc, is transferred from these chambers into the dust silo for non-contaminated dust. When the zinc and lead contents in the dust in this silo are high enough, or at a removal level the dust can be drawn off and fed into a recovery plant for recovering these metals. The non-contaminated dust is otherwise recirculated via the arc furnace.

One embodiment of the present invention, in which the melting vessel is an arc furnace, will be explained in greater detail on the basis of a process diagram (sole patent figure).

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

The sole figure is a process diagram showing the process of the present invention applied to an arc furnace.

DETAILED DESCRIPTION OF THE PREFERRED EMBODIMENT

Referring to the drawing, and depending on the needs of the operation, the individual suction points 1a, 2 of first and second flue gases A, B are connected to a first filter 6 or second filter 7 by means of control or reducing dampers or valves 18.

The first flue gases A that are generated, are collected by exhaust hoods 2 and fed into the first bag filter 6 along a first path 21 during the charging of metallic charge materials into the hot arc furnace 1, during the discharge of the slag into the slag bucket 20, and during the tapping of the steel into the steel casting ladle 19. The fans 10 arranged behind the filters 6, 7 draws the first flue gases A together with an amount of cold air from the furnace house into the exhaust hoods 2. The fans 10 then take the purified flue gases and send them to a purified gas chimney 11.

Dioxins and other toxic gases are also formed during charging due to the immediate combustion of organic components of the metallic charge. An additive 12 consisting of carbon and lime is therefore blown into the flue gas flow A in front of the filter 6. The additive 12 settles on the filter bags in the filter 6 and adsorbs the toxic substances contained in the flue gas A.

After dedusting the filter bags, the dust E is contaminated with dioxins and other toxic material from the toxic gases. The contaminated dust E is fed into the dust silo 13 via the dust discharge means 8 by means of a cellular wheel sluice 16, and then into a pushing or metering tank 14 via another cellular wheel sluice 16. The contaminated dust E is then blown pneumatically into the arc furnace 1 from the pushing or metering tank 14.

The hot second flue gases B are discharged from the arc furnace 1 along a second path via the fourth cover hole 1a during the melting operation, and are subjected to afterburning at the gap between the furnace cover elbow 1b and the water-cooled suction line 4 by adding ambient air.

Under the top platform, the second hot flue gas B enters an externally heated combustion chamber 3 in the second path. The combustion chamber 3 is designed with steel plate construction having a refractory lining and accommodates a dust discharge means 3c on the underside. The combustion chamber 3 is equipped with gas burners 3a and a fan 3b for combustion air.

The stepwise cooling of the flue gases B from ca. 1,200° C. to a temperature of about 600° C. at first takes place in the subsequent water-cooled suction line 5 of the second path.

To prevent dioxins from re-forming, the hot flue gas with a temperature of ca. 600° C. is abruptly cooled in another step. To do so, an amount of additional cold air A, which is drawn in from the furnace house and is free of flue gases, is added to the hot flue gas B from the exhaust hoods 2. This amount of additional air A is selected to be such that the cooled flue gas C will reach a filter inlet temperature of ca. 130° C.

The thus pretreated dioxin- and furan-free flue gases C are fed into the second filter 7 and purified in the filter bags. This dioxin-free dust F is fed into the dust silo 15 via a dust discharge means 9 by means of a second cellular wheel sluice 16, and is then fed via another second cellular wheel sluice 16 either into the metering tank 14 or into a dust container 17.

While a specific embodiment of the invention has been shown and described in detail to illustrate the application of the principles of the invention, it will be understood that the invention may be embodied otherwise without departing from such principles.

What is claimed is:

1. A process for treating gases from a melting vessel, the process comprising the steps of:
   collecting a first flue gas from the melting vessel during charging of metallic materials into the melting vessel, said first gas containing toxic gases and particles;
   transporting said first flue gas along a first path;
   mixing said first flue gas with an additive in said first path, said additive absorbing said toxic gases present in said collected first flue gas;
   filtering out said particles from said first flue gas and also filtering out said additive in said first path, after said additive has absorbed said toxic gas from said first flue gas mixed with said additive, said particles and said additive with said toxic gas absorbed being a contaminated dust;
   moving said contaminated dust into the melting vessel;
   melting said contaminated dust in said melting vessel;
   collecting a second flue gas from the melting vessel during said melting of said contaminated dust, said second flue gas including additional toxic gases, and non-contaminated dust;
   transporting said second flue gas along a second path;
   heating said second flue gas in said second path to destroy and decontaminate said additional toxic gases present in said collected second flue gas;
   filtering said second flue gas in said second path after said heating to remove said non-contaminated dust from said second flue gas.

2. A process in accordance with claim 1, further comprising:
   said non-contaminated dust containing elements;
   analyzing said non-contaminated dust for concentrations of said elements;
   adding said non-contaminated dust to the melting vessel if concentrations of said elements are below a value.

3. A process in accordance with claim 2, wherein: one of said elements are a heavy metal.

4. A process in accordance with claim 2, wherein: one of said elements are one of lead and zinc.

5. A process in accordance with claim 1, further comprising:
   removing a portion of said non-contaminated dust from said second flue gas during said heating of said second flue gas;
   moving said portion of said non-contaminated dust collected during said heating of said second flue gas to the melting vessel.

6. A process in accordance with claim 1, wherein: said filtering of said first and second flue gas is by one of a dry method, a wet method and a quasi-dry process.

7. A process in accordance with claim 1, wherein: said first flue gas is collected by exhaust hoods above the melting vessel.

8. A process in accordance with claim 1, wherein: said additive is carbon-lime.

9. A process in accordance with claim 1, wherein: said first and second flue gases contain dioxins when said first and second flue gases are emitted from the melting vessel.

10. A process in accordance with claim 1, further comprising:
    cooling said second flue gas after said heating and before said filtering by adding a gas cooler than said second flue gas.

11. A process in accordance with claim 1, further comprising:
    discharging slag from said melting vessel;
    tapping steel from said melting vessel;
    also collecting said first flue gas during said discharge of slag from said melting vessel and during said tapping of steel.

12. A process in accordance with claim 1, further comprising:
    melting the metallic materials in the melting vessel with said contaminated dust.

13. A process in accordance with claim 1, further comprising:
    analyzing said non-contaminated dust to determine a type and concentration of elements present in said non-contaminated dust;
    adding said non-contaminated dust to the melting vessel if concentrations of said elements are below a removal level.

14. A process in accordance with claim 13, wherein: said removal level is a magnitude of concentrations of said elements where economic recovery of said elements is possible.

15. A process in accordance with claim 14, wherein: one of said elements is lead.

16. A process in accordance with claim 14, wherein: one of said elements is zinc.

17. A process in accordance with claim 1, further comprising:
    melting said metallic materials in said melting vessel after said charging of the metallic materials to produce steel and slag;
    discharging slag from said melting vessel;
    collecting additional first flue gas during said discharge of slag;

tapping steel from said melting vessel;

collecting further additional first flue gas during said tapping of steel;

processing said additional first flue gas and said further additional first flue gas similarly to processing of said first flue gas.

18. A process for treating gases from a melting vessel, the process comprising the steps of:

collecting a first flue gas from the melting vessel during charging of metallic materials into the melting vessel, said first gas containing toxic gases and particles;

cooling said first flue gas by adding a gas cooler than said first flue gas to said first flue gas;

mixing said first flue gas with an additive, said additive absorbing said toxic gases present in said collected first flue gas;

filtering out said particles from said first flue gas and also filtering out said additive, after said additive has absorbed said toxic gas from said first flue gas mixed with said additive, said particles and said additive with said toxic gas absorbed being a contaminated dust;

moving said contaminated dust into the melting vessel;

melting said contaminated dust in said melting vessel;

collecting a second flue gas from the melting vessel during said melting, said second flue gas including additional toxic gases, and non-contaminated dust;

heating said second flue gas to destroy and decontaminate said additional toxic gases present in said collected second flue gas;

cooling said second flue gas in a first stage after said heating in a water cooled line;

cooling said second flue gas in a second stage after said first stage of cooling by adding additional gas cooler than said second flue gas to said second flue gas;

filtering said second flue gas after said heating to remove said non-contaminated dust from said second flue gas.

19. A process in accordance with claim 18, wherein:

said gas added to said first flue gas is taken from a furnace house;

said cooling of said second flue gas in said first stage is from a temperature of 1200 degrees Celsius to a temperature of 600 degrees Celsius;

said cooling of said second flue gas in said second stage is from a temperature of 600 degrees Celsius to a temperature of 130 degrees Celsius;

said additional gas added to said second flue gas is taken from said furnace house.

20. A process in accordance with claim 1, further comprising:

collecting dioxins in said first and second flue gases when said first and second flue gases are emitted from the melting vessel.

* * * * *